US012682882B2

(12) United States Patent
Yoneyama

(10) Patent No.: US 12,682,882 B2
(45) Date of Patent: Jul. 14, 2026

(54) NOISE-CANCELLING HEADPHONE DEVICE

(71) Applicant: AUDIO-TECHNICA CORPORATION, Machida (JP)

(72) Inventor: Daisuke Yoneyama, Machida (JP)

(73) Assignee: AUDIO-TECHNICA CORPORATION, Machida (JP)

( * ) Notice: Subject to any disclaimer, the term of this patent is extended or adjusted under 35 U.S.C. 154(b) by 234 days.

(21) Appl. No.: 18/290,379

(22) PCT Filed: May 17, 2022

(86) PCT No.: PCT/JP2022/020507
§ 371 (c)(1),
(2) Date: Nov. 13, 2023

(87) PCT Pub. No.: WO2022/255091
PCT Pub. Date: Dec. 8, 2022

(65) Prior Publication Data

US 2024/0274115 A1 Aug. 15, 2024

(30) Foreign Application Priority Data

May 31, 2021 (JP) ................................ 2021-091604

(51) Int. Cl.
*G10K 11/178* (2006.01)

(52) U.S. Cl.
CPC .. *G10K 11/17825* (2018.01); *G10K 11/17875* (2018.01); *G10K 2210/1081* (2013.01);
(Continued)

(58) Field of Classification Search
CPC ....... G10K 11/17825; G10K 11/17875; G10K 2210/1081; G10K 11/17823;
(Continued)

(56) References Cited

U.S. PATENT DOCUMENTS

2009/0010474 A1 1/2009 Ouryouji
2019/0075384 A1* 3/2019 Miwa .................. H04R 1/1075
2020/0077171 A1* 3/2020 Chi-Hsueh ........... H04R 1/1008

FOREIGN PATENT DOCUMENTS

JP S60-224396 A 11/1985
JP 2004-163875 A 6/2004
(Continued)

OTHER PUBLICATIONS

Extended European Search Report for European Application No. 22815843.2 dated Apr. 7, 2025; 4 pp.
(Continued)

*Primary Examiner* — Vivian C Chin
*Assistant Examiner* — Annabelle Kang
(74) *Attorney, Agent, or Firm* — HAUPTMAN HAM, LLP

(57) ABSTRACT

Provided is a noise-cancelling headphone device that prevents deterioration of reproduction frequency characteristics in a high-frequency band while preventing reduction in the reproduction output in the low-frequency band. The proposed technology is a noise-cancelling headphone device, including a speaker unit provided with a dome-shaped diaphragm having a center dome and a sub-dome, a microphone that detects ambient noise incident into the speaker unit, a baffle plate supporting the speaker unit and provided with sound emission holes to radiate reproduction sound emitted from the speaker unit, and a signal processing circuit to generate noise cancellation signal generated based on the ambient noise detected by the microphone, wherein an acoustic resistance member is provided at the position facing the sub-dome of the dome diaphragm.

6 Claims, 5 Drawing Sheets

(52) U.S. Cl.
CPC ................ *G10K 2210/3011* (2013.01); *G10K 2210/3026* (2013.01); *G10K 2210/3224* (2013.01)

(58) Field of Classification Search
CPC ............. G10K 11/17881; H04R 1/288; H04R 2460/01; H04R 1/1083
See application file for complete search history.

(56) References Cited

FOREIGN PATENT DOCUMENTS

| | | | | |
|---|---|---|---|---|
| JP | 2009-017175 | A | | 1/2009 |
| JP | 2009-278403 | A | | 11/2009 |
| JP | 2017005413 | A | * | 1/2017 |

OTHER PUBLICATIONS

PCT/ISA/210, "International Search Report for PCT International Application No. PCT/JP2022/020507," Aug. 9, 2022.

* cited by examiner

NOISE-CANCELLING HEADPHONE DEVICE

RELATED APPLICATIONS

The present application is National Phase of International Application No. PCT/JP2022/020507 filed May 17, 2022, and claims priority from Japanese Application No. 2021-091604, filed May 31, 2021, the disclosure of which is hereby incorporated by reference herein in its entirety.

TECHNICAL FIELD

This invention relates to a noise-cancelling headphone device that reduces ambient noise introduced from the outside of the device.

BACKGROUND ART

Noise-cancelling headphone devices have been used to reduce ambient noise (environment noise) radiated from the external environment.

Active noise cancellation technology has been proposed for this type of headphone device. Active noise cancellation technology uses a microphone to collect noise components entering the headphone device, generates a noise cancellation signal in the opposite phase of the noise signal based on the collected noise components, and reproduces a target sound signal by superimposing the noise cancellation signal on the target sound signal. In other words, active noise cancellation technology is a technology that drives a diaphragm with a sound signal on which the noise cancellation signal is superimposed to cancel or reduce noise components.

This active noise cancellation technology reduces noise components heard by the user by causing phase interference between the noise signal and the noise cancellation signal in the opposite phase of the noise signal.

A headphone device has been proposed that employs this type of active noise cancellation technology using a feedback method.

In a headphone device employing the feedback method, a microphone is installed in a front cavity arranged on the sound emitting side of the speaker unit. The microphone collects noise components that enter the front cavity and reproduction sound radiated from the speaker unit. The noise signal corresponding to the noise component collected by the microphone and the reproduction sound signal corresponding to the reproduction sound are input to the noise cancellation circuit. The noise cancellation circuit inverts the phases of the input noise signal and the reproduction sound signal to generate and output a noise cancellation signal. The noise cancellation signal output from the noise cancellation circuit is input to the speaker unit drive circuit and superimposed on the reproduction sound signal input from the sound source. The reproduction sound signal superimposed with the noise cancellation signal output from the speaker unit drive circuit drives the diaphragm, and the reproduction sound with reduced noise components entering from the outside of the headphone device is radiated into the front cavity.

This headphone device employing the feedback noise cancellation technology can reproduce sound with reduced noise components originating from ambient noise.

It should be noted that the front cavity is a radiating space for reproduction sound surrounded by a baffle plate on which the speaker unit is supported and an earpad provided on the sound emitting side of the baffle plate.

A headphone device that employs such feedback noise cancellation technology is described in Patent Document 1.

CITATION LIST

Patent Literature

Patent Document 1: JP 2004-163875 A

SUMMARY OF INVENTION

Technical Problem

In a headphone device employing active noise cancellation technology, reduction of noise components in the low-frequency band is particularly important. To cancel noise heard by the user, a microphone is placed near the user's ear to collect noise.

In headphone devices employing feedback noise cancellation technology, the microphone for collecting noise is placed near the diaphragm of the speaker unit. Therefore, sound waves in the high-frequency band with short wavelengths emitted from the speaker unit are also collected by the microphone for collecting noise. In this case, the sound waves in the high-frequency band are also input to the noise cancellation circuit as a signal along with the noise. Since the signal path to the noise cancellation circuit is designed to be optimized for noise in the low-frequency band, the sound wave signal level in the high-frequency band with short wavelengths is fed back and enhanced by passing through the noise cancellation circuit. In other words, the generated noise cancellation signal is fed back to cancel the low-frequency noise and enhance the sound waves in the high-frequency band to be superimposed on the reproduction sound signal. When the superimposed noise cancellation signal and the sound reproduction signal are input to the drive circuit of the speaker unit to drive the diaphragm, the respective sounds reproduced by the noise cancellation signal and the sound reproduction signal may overlap in phase, which may cause acoustic feedback.

To suppress such acoustic feedback, an acoustic resistance member can be placed between the front cavity and the entire area of the diaphragm's sound emitting surface that radiates the reproduction sound.

By adopting such a method, the sound output is attenuated by the acoustic resistance member before the reproduction sound radiated from the diaphragm is transmitted into the front cavity surrounded by the earpad. This attenuates the high-frequency bandwidth of the sound output to suppress acoustic feedback.

However, the acoustic resistance member also attenuates the audio output in the low-frequency band, degrading the reproduction frequency characteristics over the entire reproduction band of the headphone device.

An object of the present invention is to provide a noise-cancelling headphone device with good reproduction frequency characteristics throughout the entire reproduction bandwidth, while solving the problems of headphone devices employing the conventional feedback noise cancellation technology and providing optimal frequency characteristics for obtaining noise cancellation effects.

In particular, a technical object of the present invention is to provide a noise-cancelling headphone device that makes it possible to prevent acoustic feedback caused by the noise cancellation circuit in the high-frequency band while preventing reduction in the reproduction output in the low-frequency band.

Solution to Problem

In view of the above-mentioned problems, a noise-cancelling headphone device according to an aspect of the present invention includes: a speaker unit provided with a center dome and a sub-dome continuously surrounding the center dome and having a dome-shaped diaphragm; a baffle plate on which the speaker unit is supported and provided with sound emission holes to radiate reproduction sound emitted from the speaker unit; a microphone that detects ambient noise from the outside of the speaker unit; and a noise cancellation signal generator that generates a noise cancellation signal to reduce the ambient noise detected by the microphone, wherein an acoustic resistance member is provided only in an area of the baffle plate on the sound emitting side of the diaphragm that radiates reproduction sound and that faces the sub-dome of the diaphragm.

Here, the acoustic resistance member is arranged at a distance from the diaphragm.

The baffle plate is provided with a diaphragm protecting portion, and the sound emission hole is formed in the diaphragm protecting portion. The acoustic resistance member is supported by the diaphragm protecting portion.

The microphone is located on the side of the baffle plate where the reproduction sound is emitted through the acoustic resistance member. Here, the acoustic resistance member is preferably formed of a non-woven fabric having excellent acoustic absorption characteristics.

Advantageous Effects of Invention

The headphone device according to the present invention can reduce the output level of the high-frequency band radiated from the diaphragm, which is collected by the microphone, by attenuating the reproduction sound in the high-frequency band radiated from the sub-dome by using the acoustic resistance member placed to face the sub-dome, which is continuously formed around the center dome. Reducing the output level of the high-frequency band radiated from the diaphragm will reduce the high-frequency band in the reproduction sound collected by the microphone, thereby suppressing acoustic feedback from the noise cancellation circuit.

The advantages of the present invention will become more apparent from the embodiments described below with reference to the drawings.

DESCRIPTION OF EMBODIMENTS

Embodiments of a headphone device according to the present invention will be described below with reference to the drawings. The invention is not limited only to the embodiment described below, but includes embodiments that are modified as appropriate to the extent that their characteristic configuration is not changed.

The headphone device according to this embodiment is a noise-cancelling headphone device to reduce ambient noise coming from the external environment.

The headphone device according to this embodiment has a pair of headphone units, each of which is supported at each end of a headband that is worn on the head of a user listening to reproduction sound.

Figure 1:
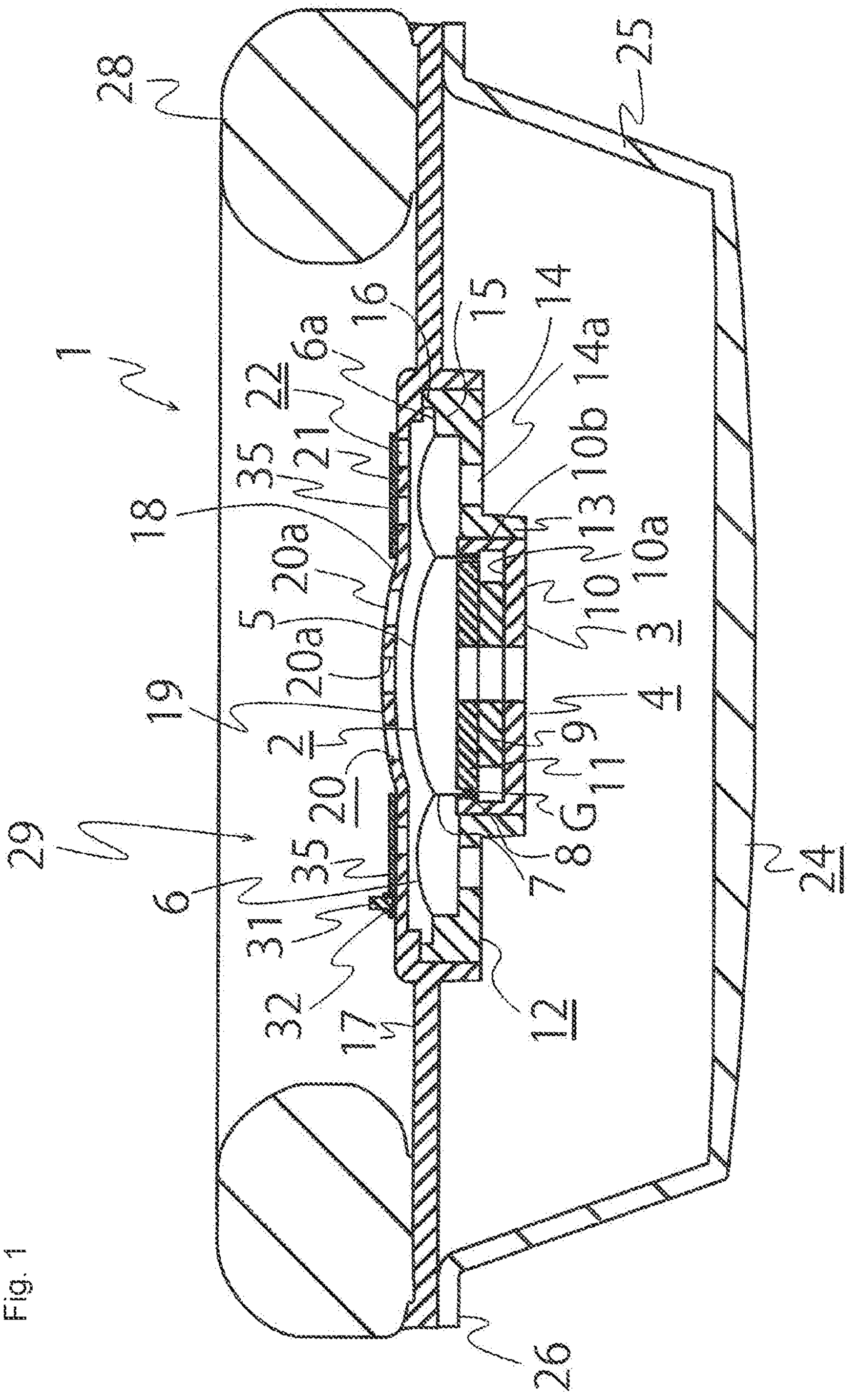
FIG. 1 is a cross-sectional view of a schematic configuration of a noise-cancelling headphone device according to an embodiment of the present invention.

The headphone unit 1 has a speaker unit 4 provided with a dome-shaped diaphragm 2 and a magnetic circuit portion 3, as shown in FIG. 1.

As shown in FIG. 1, the diaphragm 2 used in the speaker unit 4 has a center dome 5 with a dome-shaped expansion formed in the center and a sub-dome 6 formed in a continuous ring around the center dome 5. As shown in FIG. 1, the sub-dome 6 is formed in the form of an arch the center part of which expands in an arc-like shape in the cross-sectional shape in the radial direction orthogonal to the circumferential direction of the center dome 5. As shown in FIG. 1, a voice coil bobbin 7 formed in a cylindrical shape is connected to the boundary between the center dome 5 and the sub-dome 6 of the dome-shaped diaphragm 2. Around the outer periphery of the lower end of the voice coil bobbin 7 is wound a voice coil 8 to which sound signals are input. Specifically, a drive current, which corresponds to a musical signal supplied from a sound source device provided outside the headphone device, is input to the voice coil 8.

As shown in FIG. 1, the magnetic circuit portion 3 includes a magnet 9 that generates a magnetic field, a yoke 10 to which the magnet 9 is fixed, and a pole piece 11 made of magnetic material that is fixed to the upper end of the magnet 9. The yoke 10 is a magnetic material formed in the shape of a flat cup. The magnet 9 is formed in the shape of a disk and is fixed to the bottom 10*a* of the flat cup-shaped yoke 10. In other words, magnet 9 is arranged to be accommodated in this yoke 10. The yoke 10 has a peripheral wall 10*b* formed by rising from the bottom 10*a* to surround the magnet 9. The upper end face of the peripheral wall 10*b*, i.e., the open end face of the yoke 10 is substantially flush with the end face of the pole piece 11, and a gap constituting a magnetic gap G is formed between the outer circumference of the pole piece 11 and the open inner circumference of the yoke 10.

The diaphragm 2 is held with the voice coil 8 inserted in the magnetic gap G. Since a magnetic field is generated in the magnetic gap G, and the magnetic flux from the magnet 9 is concentrated and transmitted through the magnetic field, the voice coil 8 is positioned in the magnetic field.

The diaphragm 2 is supported by a support frame 12 fixed to the magnetic circuit portion 3. The support frame 12 has a yoke fixing portion 13 that is cylindrical in shape. The yoke 10 is fitted in the center of the yoke fixing portion 13. The magnetic circuit portion 3 is supported by the support frame 12 by fixing the yoke 10 with the yoke fixing portion 13.

A flange portion 14 is formed around the outer circumference of the yoke fixing portion 13 of the support frame 12.

The flange portion 14 is formed in a dish shape slightly larger than the outer diameter of the diaphragm 2. A diaphragm support portion 15 is formed on the outer periphery of the flange portion 14. An edge 6*a* formed on the outer circumference of the sub-dome 6 of the diaphragm 2 is fixed to the diaphragm support portion 15. The flange portion 14 has a plurality of through-holes 14*a* for transmitting the reproduction sound radiated in the rear direction of the diaphragm 2.

The diaphragm 2 is attached to the diaphragm support portion 15 of the support frame 12 by joining the edge 6*a* formed on the outer circumference of the sub-dome 6 to the diaphragm support portion 15 of the support frame 12. The voice coil 8 attached to the diaphragm 2 is inserted into the magnetic gap G of the magnetic circuit portion 3.

As described above, the speaker unit 4 having the dome-shaped diaphragm 2 and the magnetic circuit portion 3 is mounted on the baffle plate 17. In this embodiment, the speaker unit 4 is fixed by gluing the mounting tab 16 formed on the periphery of the flange portion 14 of the support frame 13 to the rear side of the baffle plate 17.

Figure 2:
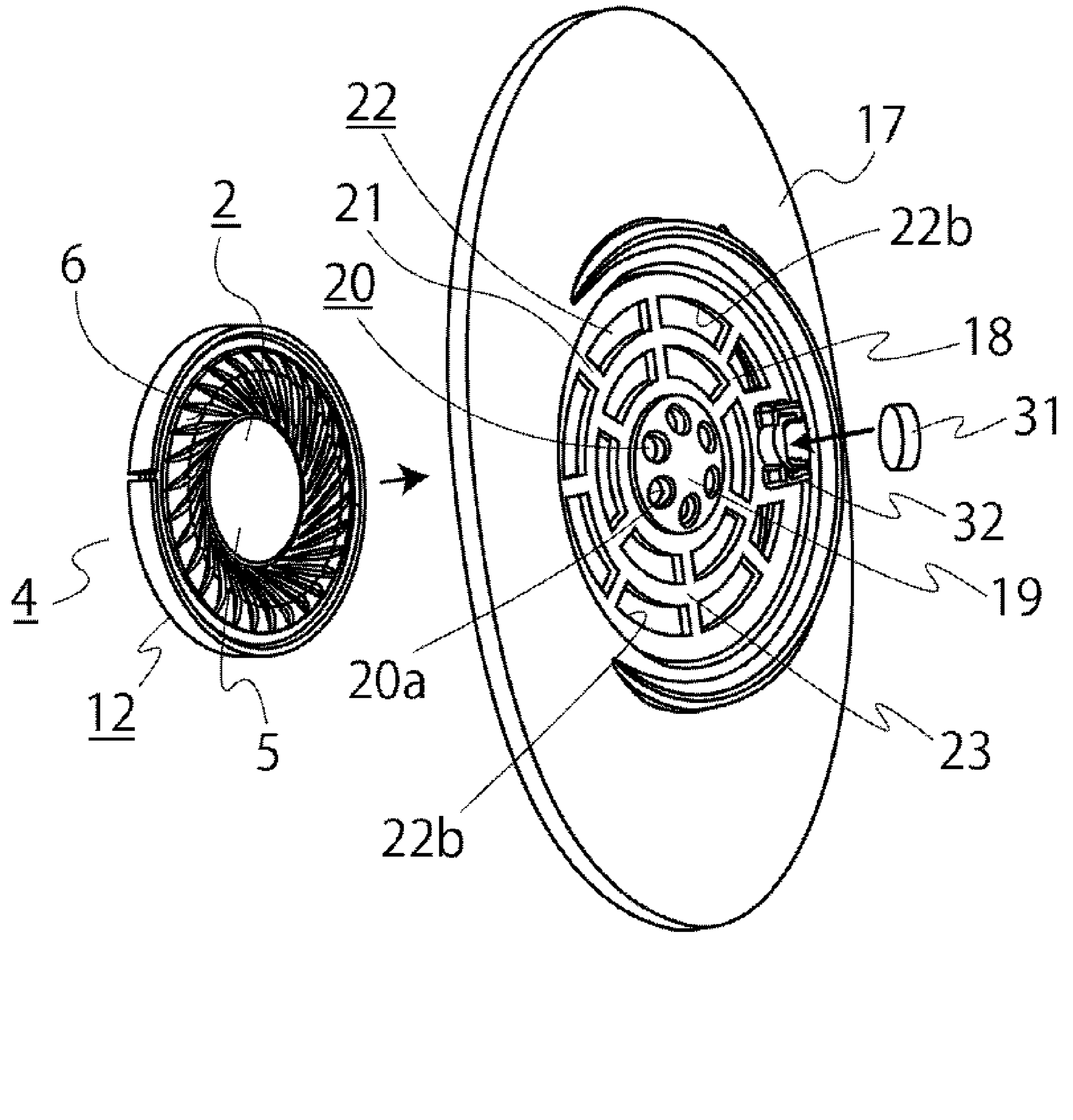
FIG. 2 is an exploded view illustrating a speaker unit and a baffle plate used in the headphone device according to this embodiment.
Figure 3:
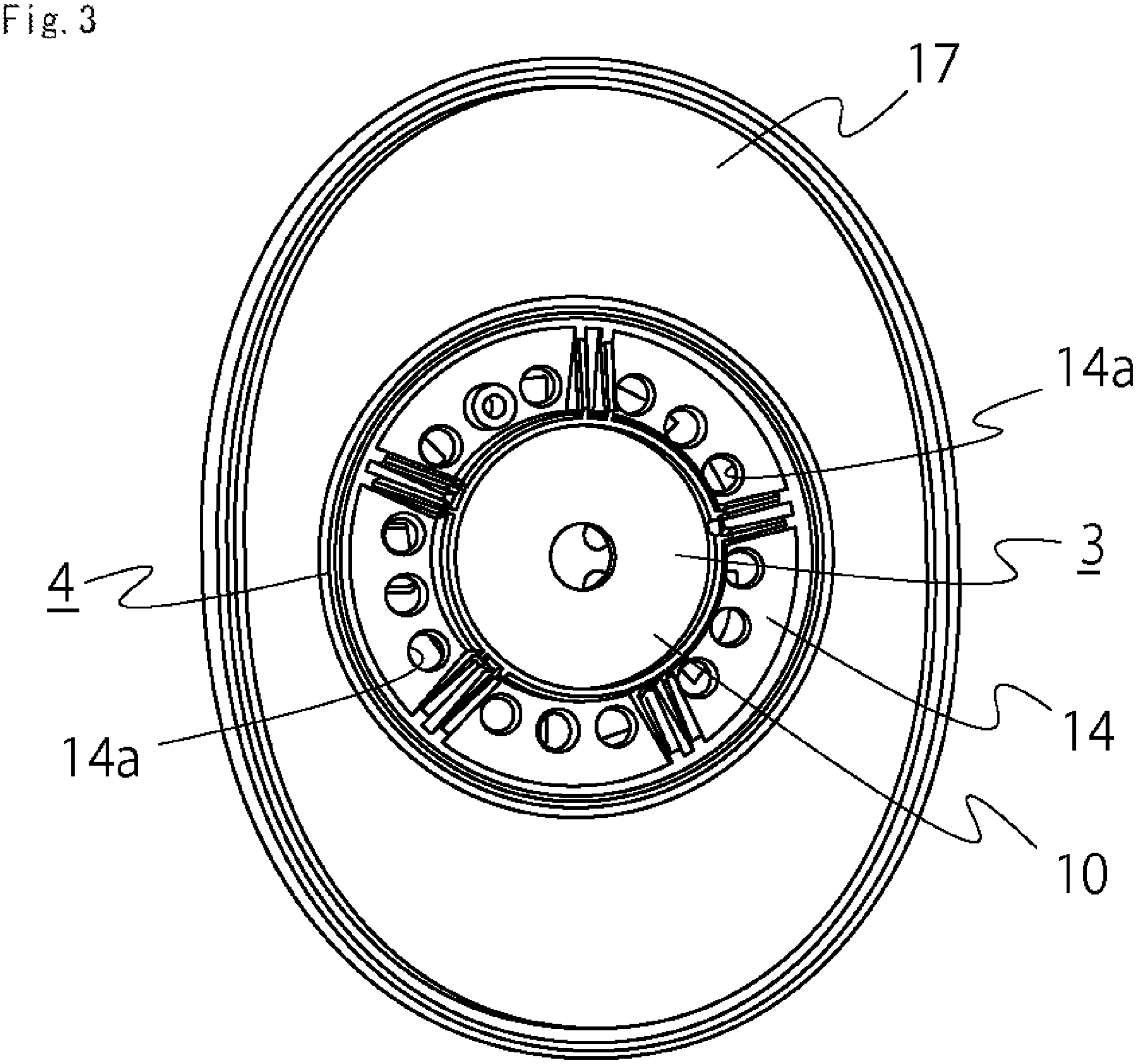
FIG. 3 is a rear view illustrating the speaker unit used in the headphone device according to this embodiment attached to the baffle plate.

The baffle plate 17 to which the speaker unit 4 is fixed is formed in the form of a thin plate with an oval shape, as shown in FIGS. 2 and 3. In the area of this baffle plate 17 facing the diaphragm 2, a diaphragm protecting portion 18 is formed to protect the diaphragm 2 from external shocks. The portion of the diaphragm protecting portion 18 facing the center dome 5 is formed into a center dome protecting portion 19. In the center dome protecting portion 19, a central sound hole group 20 is formed. The central sound hole group 20 is composed of a plurality of circular sound holes 20*a* formed in a ring shape, allowing the reproduction sound radiated from the diaphragm 2 to pass through and be radiated to the outside of the speaker unit 4.

The portion of the diaphragm protecting portion 18 facing the sub-dome 6 is formed into a sub-dome protecting portion 21. In the sub-dome protecting portion 21, a peripheral sound hole group 22 is formed. The peripheral sound hole group 22 allows reproduction sound radiated from the diaphragm 2 to pass through and be radiated to the outside of the speaker unit 4. As shown in FIG. 2, the peripheral sound hole group 22 is configured so that a plurality of outer peripheral sound holes 22*b* surround the central sound hole group 20. The outer peripheral sound holes 22*b* are formed by dividing a plurality of concentric circles with connecting pieces 23. In the present embodiment, the outer peripheral sound holes 22*b* are formed so that two concentric circles surround the central sound hole group 20.

In this embodiment, a housing member 24 is attached to the rear side of the baffle plate 17 to which the speaker unit 4 is attached, so as to accommodate the speaker unit 4. The housing member 24 has a cup-shaped speaker unit housing portion 25, as shown in FIG. 1. The housing member 24 is attached to the baffle plate 17 by fixing a mounting tab 26 formed on the periphery of the opening side of the speaker unit housing portion 25 to the back side of the baffle plate 17 by using screws or other fixing means, thereby accommodating the speaker unit 4 in the speaker unit housing portion 25.

As shown in FIG. 1, an earpad 28 is attached to the front side of the baffle plate 17, which emits the sound reproduced by the speaker unit 4. The earpad 28 is formed in a ring shape by encasing a slightly elastic material such as urethane foam having a predetermined thickness. The earpad 28 is formed into a ring shape with a size that surrounds the diaphragm protecting portion 18 and is attached along the outer edge of the baffle plate 17.

The area enclosed by the baffle plate 17 and the earpad 28 constitutes the front cavity 29 from which the reproduction sound emitted from the speaker unit 4 is radiated.

The headphone device according to this embodiment is provided with a microphone 31 that detects ambient noise incident on the speaker unit 4 from the outside of the headphone unit 1. The microphone 31 is located on the side from which the reproduction sound from the speaker unit 4 is radiated, in this embodiment, in the front cavity 29. The microphone 31 is fixed and attached to the microphone mounting portion 32 formed on the front side of the baffle plate 17 and in a part of the diaphragm protecting portion 18.

In this embodiment, the microphone mounting portion 32 is provided on the outer periphery of the diaphragm protecting portion 18 where the sub-dome protecting portion 21 is formed.

The microphone 31 used here detects ambient noise entering the front cavity 29 as noise components.

In this embodiment, the microphone 31 simultaneously collects and detects the reproduction sound radiated from the speaker unit 4 as well as the noise component.

The microphone 31 used here is preferably small enough not to affect the reproduction sound radiated from the speaker unit 4 when it is placed inside the headphone unit 1. The microphone 31 may be either a dynamic microphone or a condenser microphone (ECM). The microphone 31 may also be a MEMS (micro electro mechanical systems) type microphone.

The headphone device according to this embodiment employs a feedback method as a noise cancellation method to reduce noise components detected from ambient noise. The microphone 31 installed in the headphone device collects noise components entering the front cavity 29 and reproduction sound radiated from the speaker unit 4. The noise signal corresponding to the noise component collected by the microphone 31 and the reproduction sound signal corresponding to the reproduction sound are input to the noise cancellation circuit, which is not shown in the figure. The noise cancellation circuit inverts the phases of the input noise signal and the reproduction sound signal to generate and output a noise cancellation signal. The noise cancellation signal output from the noise cancellation circuit is input to the speaker unit drive circuit and superimposed on the reproduction sound signal output from the sound source. The reproduction sound signal superimposed with the noise cancellation signal output from the speaker unit drive circuit is input to the voice coil 8 of the speaker unit 4.

When the reproduction sound signal is input to the voice coil 8, the voice coil bobbin 7 is driven and displaced in a direction parallel to its center axis by interaction with the magnetic field generated in the magnetic gap G of the magnetic circuit portion 3, causing the diaphragm 2 to vibrate. The vibration of the diaphragm 2 radiates reproduction sound according to the frequency of the sound reproduction signal from the diaphragm 2. At this time, the input signal level of the sound reproduction signal output from the sound source is higher than the signal level of the generated noise cancellation signal. Therefore, even if the noise cancellation signal is superimposed, the reproduction sound is emitted from diaphragm 2.

The diaphragm 2 used in the speaker unit 4 according to this embodiment is formed in a dome shape with a center dome 5 and a sub-dome 6, as shown in FIGS. 1 and 2. In the low-frequency band below 1 kHz, the dome-shaped diaphragm 2 radiates reproduction sound in the piston motion mode, in which the entire diaphragm 2 vibrates in unison, and in the high-frequency band above 1 kHz, the dome-shaped diaphragm 2 radiates reproduction sound in the split vibration mode, in which the diaphragm 2 vibrates partially. In the dome-shaped diaphragm 2, the reproduction output in the high-frequency band reproduced by the split vibration mode is larger in the region of the sub-dome 6.

Therefore, in this embodiment, an acoustic resistance member 35 is provided to control the reproduction output in the high-frequency band radiated from the region of the sub-dome 6.

Figure 4:
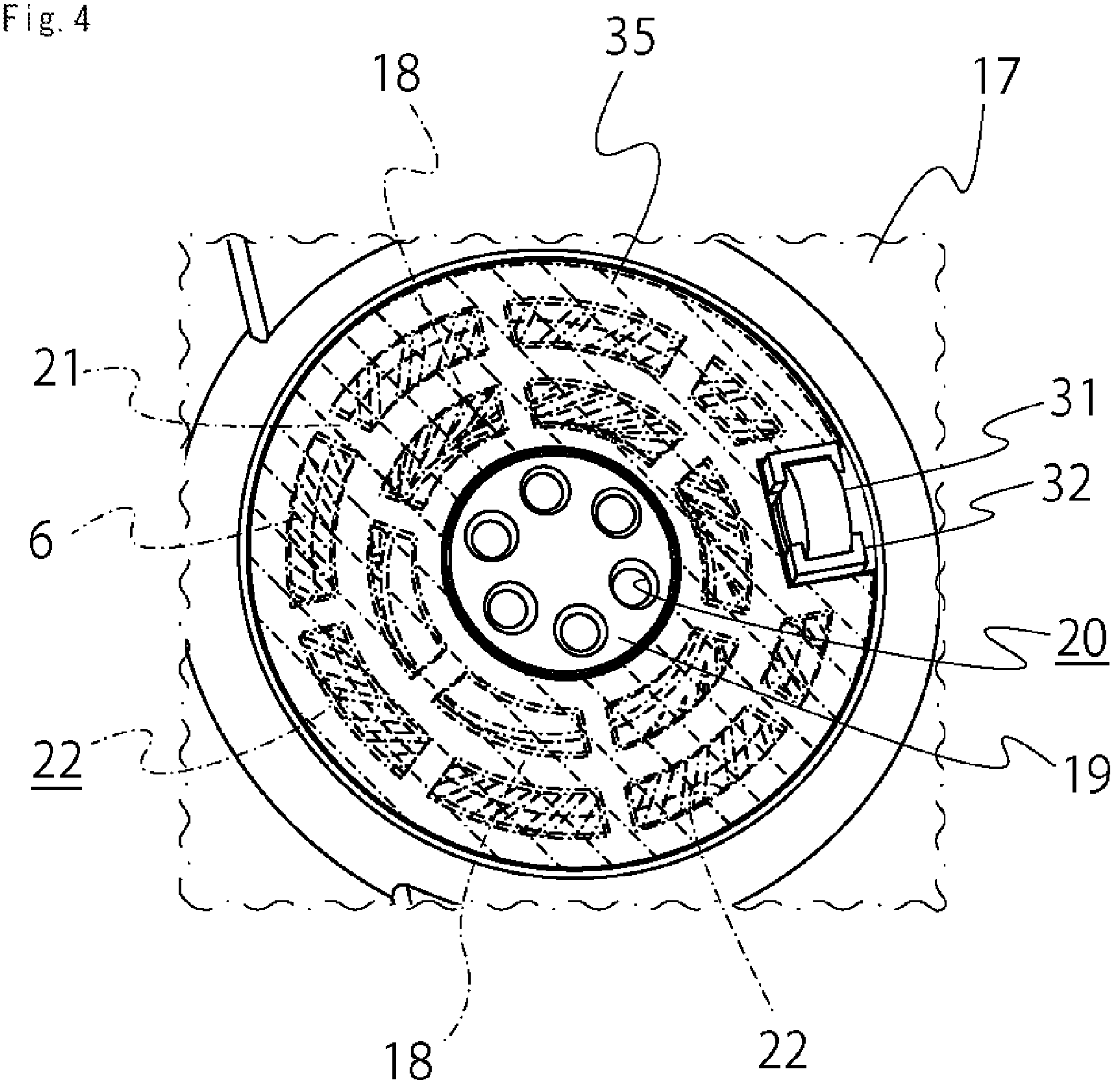
FIG. 4 is a perspective view illustrating a state in which an acoustic resistance material used in the headphone device according to this embodiment is attached to the sub-dome protecting portion of the baffle plate.

The acoustic resistance member 35 is attached to the front side of the sub-dome protecting portion 21, the side facing the front cavity 29, as shown in FIGS. 1 and 4.

In this embodiment, the acoustic resistance member 35 is arranged to cover the entire surface of the sub-dome protecting portion 21. The acoustic resistance member 35 is formed of a material that absorbs reproduction sound in the high-frequency band and reduces the reproduction output. In this embodiment, the acoustic resistance member 35 is formed of a high-density non-woven fabric to efficiently absorb the reproduction sound. Here, the acoustic resistance member 35 made of non-woven fabric is pasted to the front side of the sub-dome 21 by using an adhesive.

The acoustic resistance member 35 may be made of any material as long as it is capable of absorbing high-frequency reproduction sound with high efficiency to reduce the reproduction output in the high-frequency band. For example, porous urethane foam or woven fabric can be used for the acoustic resistance member 35.

In the headphone unit 1 according to this embodiment, the acoustic resistance member 35 for reducing the reproduction output in the high-frequency band is provided at a position facing the sub-dome 6, where the reproduction output in the high-frequency band is larger. This configuration of the headphone unit 1 reduces the reproduction output in the high-frequency band radiated from the sub-dome 6 and into the front cavity 29. The headphone unit 1 of this embodiment reduces the reproduction output in the frequency band from 5 kHz to 20 kHz. This reduction of the reproduction output in the high-frequency band reduces the sound collection level in the high-frequency band collected by the microphone 8 located in the front cavity 29. In particular, the wavelength of sound waves in the frequency band of 5 kHz to 20 kHz is short and is about the same as the distance between the sub-dome 6 and the microphone 8. Therefore, the sound waves in the 5 kHz to 20 KHz frequency band tend to be in phase at the distance between the sub-dome 6 and the microphone 8. Acoustic feedback can be suppressed by controlling the reproduction output in the frequency band of 5 kHz to 20 KHz.

The microphone 8 located in the front cavity 29 collects both the reproduction sound radiated from the speaker unit 4 and the ambient noise incident from the outside of the headphone unit 1. With regard to this, the reproduction output in the high-frequency band radiated from the speaker unit 4 is reduced, thereby lowering the sound collection level in the frequency band that interferes with each other and causes acoustic feedback. As a result, the occurrence of acoustic feedback could be suppressed in the reproduction sound in the high-frequency band in the range of 5 kHz to 20 KHz.

It should be noted that, in the headphone unit 1 according to this embodiment, the reproduction sound in the low-frequency band below 5 kHz, which is mainly radiated from the center dome 5, is radiated directly from the center dome protecting portion 19 into the front cavity 29. Thus, the reproduction output in the low-frequency band below 5 kHz is not attenuated.

Therefore, the headphone unit 1 according to this embodiment can achieve accurate noise cancellation for noise components in the low-frequency band targeted by the active noise cancellation function. In addition, the speaker unit 4 according to this embodiment can maintain good reproduction characteristics in the low-frequency band while suppressing the occurrence of peaks due to acoustic feedback in the high-frequency band.

The headphone unit 1 according to this embodiment, a headphone unit 101 in which the acoustic resistance member 35 is arranged on the baffle plate 14 to cover the entire surface of the speaker unit 4 including the center dome 5 of the dome-shaped diaphragm 2 (Comparative Example 1), and a headphone unit 102 without the acoustic resistance member (Comparative Example 2) were prepared and their respective acoustic reproduction characteristics were measured.

The same sound signal from the same sound source was input to each of the headphone units 1, 101, and 102, and the characteristics were measured in an environment with common ambient noise.

Figure 5:
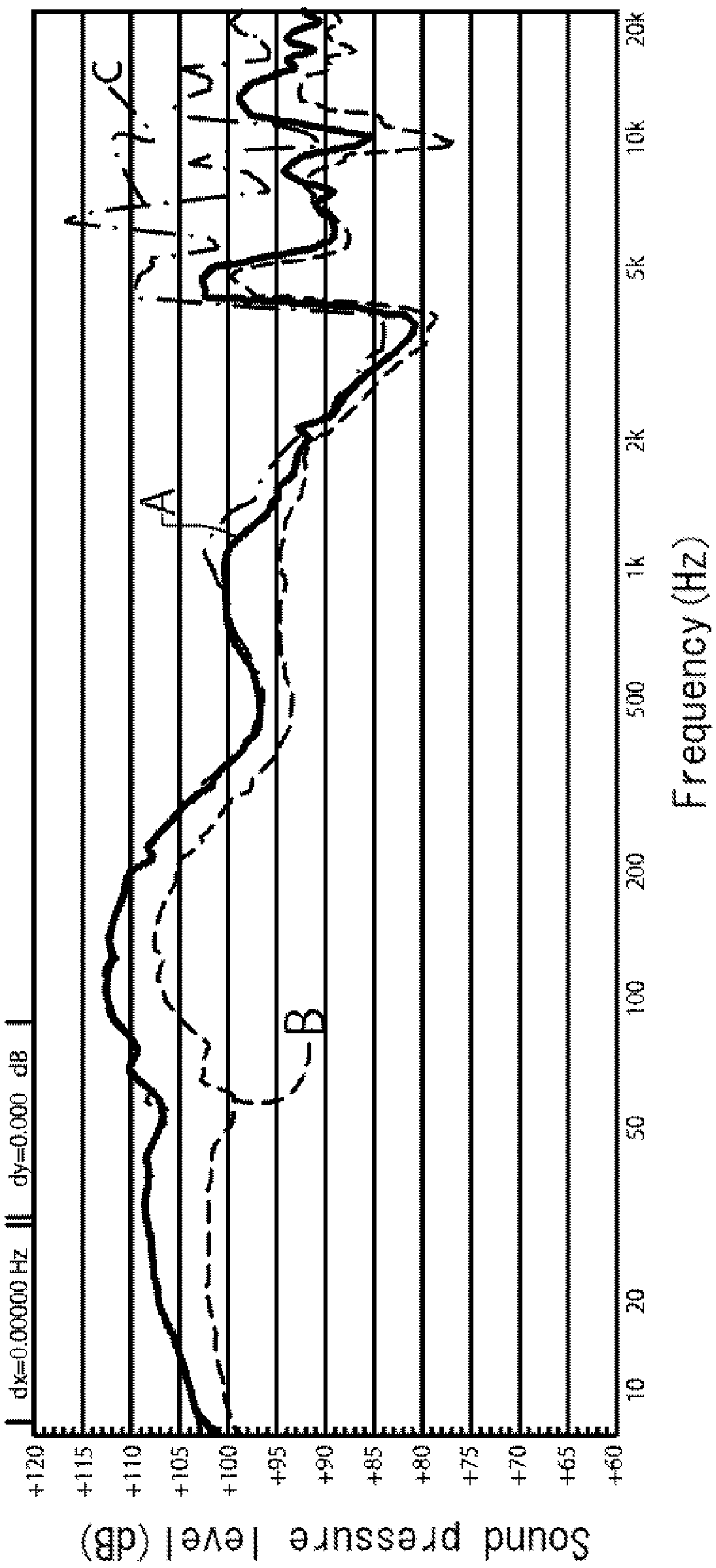
FIG. 5 is an acoustic reproduction characteristic diagram showing a comparison of the acoustic reproduction characteristics of the headphone device according to the present invention, the headphone device preceding the present invention, and a conventional headphone device.

As a result, the sound pressure frequency characteristics were obtained for the headphone unit 1 according to this embodiment, as indicated by line A in FIG. 5. As is clear from this frequency characteristics A, in the headphone unit 1 according to this embodiment, no occurrence of peaks due to acoustic feedback was detected in the high-frequency band between 5 kHz and 20 kHz. In addition, no decrease in sound pressure level was observed in the low-frequency band below 5 kHz. Therefore, the headphone unit 1 according to this embodiment provided well-balanced and good reproduction characteristics over the frequency band from low to high frequencies.

In contrast, the sound pressure frequency characteristics of headphone unit 101, in which the entire surface of diaphragm 2 including center dome 5 was covered by acoustic resistance member 35, were as indicated by line B in FIG. 5. As shown in the frequency characteristics B, in the headphone unit 101, no occurrence of peaks due to acoustic feedback was observed in the high-frequency band between 5 kHz and 20 kHz, but the sound pressure level decreased in the low-frequency band below 5 kHz. Therefore, the headphone unit 101 showed a decrease in sound pressure level in the low-frequency band.

The sound pressure frequency characteristics of the headphone unit 102 having no acoustic resistance member were as indicated by line C in FIG. 5. In the headphone unit 102, as is clear from the frequency characteristics C, no decrease in sound pressure level was observed in the low-frequency band below 5 kHz, but peaks due to acoustic feedback occurred in the high-frequency band between 5 kHz and 20 kHz. Therefore, the headphone unit 102 could not achieve good reproduction characteristics.

In the aforementioned embodiment, the diaphragm protecting portion 18 is formed integrally with the baffle plate 17, but the diaphragm protecting portion 18 may be formed independently of the baffle plate 17. In this case, the diaphragm protecting portion 18 is arranged to cover the sound emission holes in the baffle plate 17 that radiate the reproduction sound.

The headphone device using the headphone unit 1 according to this embodiment can suppress acoustic feedback caused by interference of high-frequency components, prevent deterioration of reproduction frequency characteristics in the high-frequency band, and also maintain good reproduction frequency characteristics in the low-frequency band.

REFERENCE SIGNS LIST

1 headphone unit, 2 diaphragm, 3 magnetic circuit portion, 4 speaker unit, 5 center dome, 6 sub-dome, 7 voice coil bobbin, 8 voice coil, 9 magnet, 10 yoke, 11 pole piece, 12 support frame, 13 yoke fixing portion, 14 flange portion, 15 diaphragm support portion, 16 mounting tab, 17 baffle plate, 18 diaphragm protecting portion, 19 center dome protecting portion, 20 central sound hole group, 21 sub-dome protecting portion, 22 peripheral sound hole group, 23 connecting piece, 24 housing member, 25 speaker unit housing portion, 26 mounting tab, 28 earpad, 29 front cavity, 31 microphone, 32 microphone mounting portion, 35 acoustic resistance member

The invention claimed is:

1. A noise-cancelling headphone device, comprising:

a speaker unit provided with a center dome and a sub-dome continuously surrounding the center dome and having a dome-shaped diaphragm;

a baffle plate on which the speaker unit is supported and provided with sound emission holes to radiate reproduction sound emitted from the speaker unit;

a microphone located on a side from which reproduction sound from the speaker unit is radiated, the microphone being configured to detect ambient noise entering from outside of the speaker unit to the side of the speaker unit from which the reproduction sound is radiated; and a noise cancellation signal generator configured to generate a noise cancellation signal to reduce the ambient noise detected by the microphone, wherein the baffle plate is provided with a diaphragm protecting portion located on the side from which the reproduction sound is radiated, the diaphragm protecting portion being provided with the sound emission holes to radiate the reproduction sound emitted from the speaker unit;

the diaphragm protecting portion includes a first portion facing the center dome and a second portion facing the sub-dome; and an acoustic resistance member is provided only in an area of the baffle plate covering the sub-dome and controlling the reproduction sound radiated from the sub-dome, the acoustic resistance member being supported by the second portion of the diaphragm protecting portion.

2. The noise-cancelling headphone device according to claim 1, wherein the acoustic resistance member is arranged at a distance from the diaphragm.

3. The noise-cancelling headphone device according to claim 1, wherein the microphone is located on the side of the baffle plate where the reproduction sound is emitted through the acoustic resistance member.

4. The noise-cancelling headphone device according to claim 1, wherein the acoustic resistance member is formed of a non-woven fabric.

5. The noise-cancelling headphone device according to claim 1, wherein the acoustic resistance member is configured to reduce the reproduction sound radiated from the sub-dome in a high-frequency band above 1 kHz.

6. The noise-cancelling headphone device according to claim 1, wherein the microphone is located in a front cavity constituted by the baffle plate and an earpad located at a side of the baffle plate from which the reproduction sound is radiated.

* * * * *